US007921374B2

(12) United States Patent
Griffin (10) Patent No.: US 7,921,374 B2
(45) Date of Patent: Apr. 5, 2011

(54) ADDING INTERROGATIVE PUNCTUATION TO AN ELECTRONIC MESSAGE

(75) Inventor: Jason Tyler Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1946 days.

(21) Appl. No.: 10/887,279

(22) Filed: Jul. 8, 2004

(65) Prior Publication Data

US 2006/0010398 A1 Jan. 12, 2006

(51) Int. Cl.
*G06F 3/048* (2006.01)

(52) U.S. Cl. ........................................ 715/780; 715/864

(58) Field of Classification Search .................. 715/780, 715/864; 345/169
See application file for complete search history.

(56) References Cited

U.S. PATENT DOCUMENTS

| 5,124,702 | A | | 6/1992 | van Ardenne | |
|---|---|---|---|---|---|
| 5,737,617 | A | | 4/1998 | Bernth et al. | |
| 6,067,514 | A | * | 5/2000 | Chen | 704/235 |
| 6,223,059 | B1 | | 4/2001 | Haestrup | |
| 6,307,548 | B1 | | 10/2001 | Flinchem et al. | |
| 6,359,572 | B1 | | 3/2002 | Vale | |
| 6,396,482 | B1 | * | 5/2002 | Griffin et al. | 345/169 |
| 6,718,303 | B2 | * | 4/2004 | Tang et al. | 704/235 |
| 7,088,341 | B2 | * | 8/2006 | Koch et al. | 345/169 |
| 2004/0138881 | A1 | * | 7/2004 | Divay et al. | 704/231 |

OTHER PUBLICATIONS

IBM Corp., "Automatic Capitalization and Spacing of Sentences", IBM Technical Disclosure Bulletin, vol. 28, No. 9, Feb. 1986, pp. 4160-4161.

* cited by examiner

*Primary Examiner* — Weilun Lo
*Assistant Examiner* — Tuyetlien T Tran
(74) *Attorney, Agent, or Firm* — Finnegan, Henderson, Farabow, Garrett & Dunner, LLP (57) ABSTRACT

Interrogative punctuation is automatically added to a sequence of characters entered into a handheld device upon termination of the sequence, such as by double actuation of the spacebar, when the first word, or the first and third words at the beginning of the sequence, of after a comma or semicolon, are indicative of an interrogatory.

20 Claims, 3 Drawing Sheets

ADDING INTERROGATIVE PUNCTUATION TO AN ELECTRONIC MESSAGE

BACKGROUND OF THE INVENTION

1. Field of the Invention

Aspects of this invention are related to increasing the efficiency of inputting interrogative punctuation into electronic messages, such as those generated in a handheld electronic device.

2. Background Information

Electronic messages, such as those communicated through handheld electronic devices, are often assembled through typing on a keyboard. Some such devices have a reduced keyboard with multiple characters, which can include punctuation marks, assigned to each key. Several schemes for disambiguating the multiple characters assigned to a key include selective action on the key, such as for instance rocking the key one way or another; actuation of a common additional, disambiguating input; or text interpretation. In the latter case, the device predicts the character that was intended by the user based upon a set of rules, or selects a character based on the probability that a word stored in a list in memory is being entered. Characters previously selected can change as additional keystrokes are entered and the possible combinations of characters intended narrows.

Commonly owned U.S. Pat. No. 6,396,482 discloses an electronic handheld device in which a sentence can be terminated by actuating the spacebar twice in succession. This action inserts a "." (period) at the end of the sentence, adds a space, and initiates capitalization of the next character input as the first letter of the first word of a new sentence. However, the "?" (question mark) shares a key and is selected by simultaneous actuation of a specialized key.

SUMMARY OF THE INVENTION

In accordance with one embodiment of the invention, interrogative punctuation is automatically added to a sequence of characters input to a handheld electronic device when the first word or a combination of the first and third words at the beginning of the sequence of characters or after a comma or semicolon is indicative of an interrogatory. The interrogative punctuation includes the placement of a "?" (question mark) at the end of the sequence of characters, and for the Spanish language, the additional insertion of "¿" (inverted question mark) at the beginning of the sequence of characters. Where the "?" (question mark) is added at the end of the terminated sequence of characters by depressing a spacebar twice in succession, a space can be added after the "?" (question mark).

More particularly, one aspect of the invention is directed to a method of inputting interrogative punctuation into text generated by a handheld electronic device comprising the steps of: inputting at least one sequence of characters comprising the text; examining the at least one sequence of characters for at least a first word at the beginning of the sequence or after a comma or semicolon indicative of an interrogatory; and inputting termination of the at least one sequence of characters and automatically adding the interrogative punctuation to the at least one sequence of characters when the at least first word at the beginning of the at least one sequence of characters is indicative of an interrogatory. Where the handheld electronic device has a keyboard including character keys and a full stop input, inputting the at least one sequence of characters comprises actuating the character keys and inputting termination of the at least one sequence of characters comprises actuating the full stop input. Where the full stop input is a spacebar, actuating the full stop input comprises actuating the space bar twice in succession to add a "?" (question mark) at the end of the at least one sequence of characters. This double actuation of the spacebar can also be used to enter a space after the "?" (question mark) and in one embodiment, capitalizing the first word of a second sequence of characters input following double spacebar activation.

The examining of the at least one sequence of characters for at least one word at the beginning indicative of an interrogatory can comprise storing a list of words indicative of an interrogatory when occurring at the beginning of the at least one sequence of characters, identifying the at least one word at the beginning of the at least one sequence of characters and searching the list for a match for that at least one word at the beginning of the sequence. The storing of the list of words can further comprise storing in the list selected combinations of first and third words indicative of an interrogatory when occurring at the beginning of the at least one sequence of characters, identifying the first and third words of the at least one sequence of characters and searching the list for a match for the first and third words.

Where the at least one sequence of characters defines a statement in the Spanish language, automatically adding interrogative punctuation comprises adding "¿" (inverted question mark) at the beginning of the at least one sequence of characters in addition to adding "?" (question mark) at the end of the at least one sequence of characters.

Another aspect of the invention is directed to a handheld electronic device comprising: a keyboard having a plurality of keys though which at least one sequence of characters can be input and a termination input through which the sequence of characters can be terminated; a display in which the at least one sequence of characters input is displayed; and a processor comprising means examining the at least one sequence of characters for at least one word in the beginning of the sequence of characters indicative of an interrogatory, and means for adding interrogative punctuation to the sequence of characters on the display when the termination input is actuated and the at least one word at the beginning of the at least one sequence of characters is indicative of an interrogatory. The means for examining the at least one sequence of characters can comprise a memory for storing a list of words that are indicative of an interrogatory when occurring at the beginning of the at least one sequence of characters, means identifying the at least one first word at the beginning of the at least one sequence of characters, and means searching the list for a match for the at least one word at the beginning of the at least one sequence of characters. In another embodiment, the memory further stores in this list selected combinations of a first word and a third word in at least one sequence of characters which are indicative of an interrogatory, the means identifying the first word that also identifies the third word in the at least one sequence of characters and the means searching the list also searches for a match for the first and third words in the at least one sequence of characters.

As to another aspect of the invention, the keyboard can further include means to override the interrogative punctuation.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
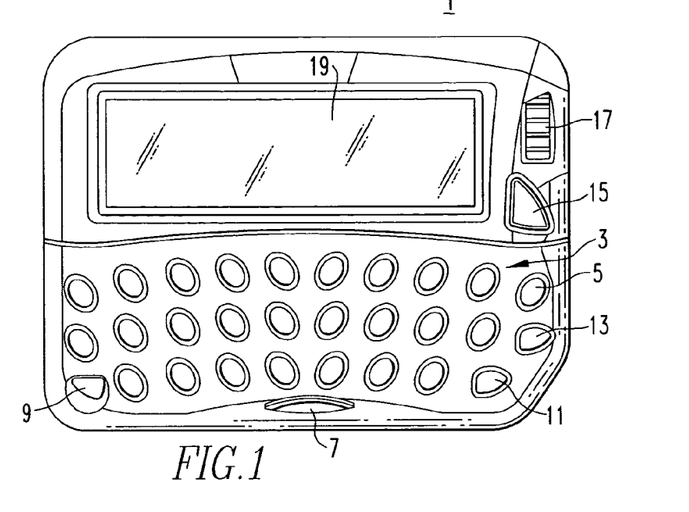
FIG. 1 is a front view of a handheld device incorporating the invention.

Aspects of the invention are directed to a method and an apparatus for automatically adding interrogative punctuation to electronic messages. FIG. 1 illustrates an exemplary handheld electronic device 1 through which the various aspects of the invention may be implemented. The device 1 has a keyboard 3 that includes a plurality of keys 5. In the exemplary embodiment of the invention, the keys 5 implement a "qwerty" keyboard. Alternatively, the keyboard 3 can have a reduced number of keys 5 where each key can input multiple characters. Even in the case of the "qwerty" keyboard of the exemplary device, the keys 5 can input additional characters beside the letters of the "qwerty" keyboard such as numerals and punctuation marks. The present invention may also be used with a full keyboard (not shown).

The keyboard 3 shown includes a number of specialized keys in addition to the keys 5. The specialized keys include a spacebar 7, an alt key 9, a cap key 11, a line feed key 13 and a backspace key 15. A thumbwheel 17 can be used to scroll through (by rotating) and selecting (by pressing the edge) entries on a display 19.

As is known, the device 1 can perform a number of functions, such as for example, sending and receiving e-mails wirelessly, recording notes, storing addresses, maintaining a calendar, and other functions. Many of these functions involve typing in text using the keyboard 3 in a well-known manner. The characters appear in sequence on the display 19 as they are entered. In accordance with an aspect of the invention, the spacebar 7 can also serve as a termination input for terminating the sequence of characters such as at the end of a sentence. This function is implemented by pressing the spacebar twice in succession. As discussed above, this double actuation of the spacebar 7 has been used prior to the present invention to place a "." (period) at the end of the terminated sequence of characters, e.g., the end of a sentence, to add a space after the "." (period) and to initiate capitalization of the next character as the first letter of the first word in a new sentence.

In accordance with this aspect of the present invention, this termination of the sequence of characters, such as by pressing the spacebar 7 twice in succession, results in the addition of interrogative punctuation to the sequence of characters when the first word of the sequence is indicative of an interrogatory. For example, the words "who," "what," "where," and "why" when appearing at the beginning of a sentence indicate that a question is being asked and interrogative punctuation needs to be added to the sequence of characters. Up to now, it has been necessary to manually add the proper punctuation by selecting the appropriate key or keys on the keyboard. In accordance with the invention, the interrogative punctuation is automatically entered when the sequence of characters is terminated such as by pressing the spacebar 7 twice. Other user action, other than pressing the spacebar twice in succession, may be used to terminate the sequence of characters and enter the interrogative punctuation. Use of the double actuation of the spacebar is particularly advantageous as it functions well with the previous practice of using this action to terminate declarative sentences and insert a period. When the two practices are combined, the proper punctuation is inserted with minimum strokes. It should be appreciated that the sequence of characters need not be a complete sentence. For instance, it is common to generate simple statements such as "why?" or "where?" in text messaging for convenience, and economy of time and effort. The sequence is terminated by the user initiating the termination of the sequence of characters at the desired point.

In accordance with an exemplary embodiment of the invention, the recognition of the first word in the sequence of characters is indicative of an interrogatory is carried out by determining if the first word matches any such words stored in a stored list. An exemplary list is set forth in Table 1 as follows:

TABLE 1

| are | aren't | how |
| can | can't | were |
| could | couldn't | why |
| does | doesn't | won't |
| is | isn't | who |
| should | shouldn't | whom |
| would | wouldn't | what |
| where did | where'd | when |
| | | where |
| | | whose |

The first word of the sequence of characters is determined by the first actuation of the spacebar in the sequence of characters. Of course, if the double actuation of the spacebar occurs before any single actuation, a one word interrogatory statement has been entered and the interrogative punctuation is inserted.

Interrogative punctuation entered automatically by the device is the "?" (question mark) at the end of the sequence of characters. If the Spanish language has been selected "¿" (inverted question mark) is also added at the beginning of the sequence of characters. As mentioned, the double actuation of the spacebar 7 can also enter a space after the "?" (question mark) and initiate capitalization of the first character entered in the next sequence of characters, i.e., the next sentence.

If the user does not want the interrogative punctuation, it can be removed manually and replaced by the desired punctuation using the keyboard. Some words that appear at the beginning of a sentence or statement may initiate a declaratory or interrogatory statement. The ambiguity may often be resolved by subsequent words in the sequence of characters. For instance, the word "do" may launch a declaratory statement; "Do it now." or an interrogatory statement "Do you have it?". Thus, in accordance with another aspect of the invention, the sequence of characters can also be examined for combinations of the first word with other words that are indicative of an interrogatory. In the example above, the first and successive (e.g., third or fourth) words combine to establish an interrogatory. The second word is not determinative. For instance, the second statement may be "Do we have it?". Thus, combinations of first and third words in the sequence of characters indicative of an interrogatory statement can be added to the list. Examples of such combinations of words are as follows:

TABLE 2

| do_have | does_have | do_care | does_care |
| do_want | does_want | do_need | does_need |
| do_know | does_know | | |

Words indicative of an interrogatory do not necessarily occur at the beginning of a sentence. For instance, an interrogatory sentence may begin with a prepositional phrase such as, "if it rains, what shall we do?". Thus, in accordance with another aspect of the invention, the list of words is searched for a match for the first word, or the first and third words occurring after a comma or a semicolon. Again, if automatic insertion of interrogative punctuation is not desired, it can be removed manually, but for most occasions, the correct punctuation will be automatically inserted, thereby expediting the message formation process.

Thus, in accordance with aspects of the invention, interrogative punctuation is inserted into text generated by a handheld device by: 1) inputting a desired sequence of characters; 2) examine the sequence of characters for the first word, or the first and third words at the beginning of the sequence or after a comma or semicolon, indicative of an interrogatory, and 3) inputting termination of the sequence of characters, such as by actuation of the spacebar twice in succession, and automatically adding interrogative punctuation to the sequence of characters when the first word or the first and third words at the beginning of the sequence or after a comma or semicolon, is or are indicative of an interrogatory.

While in the exemplary method, the first word or the first and third words, are identified and matched as the characters are inserted, this matching may be implemented at the time the input of the sequence of characters is terminated.

Figure 2:
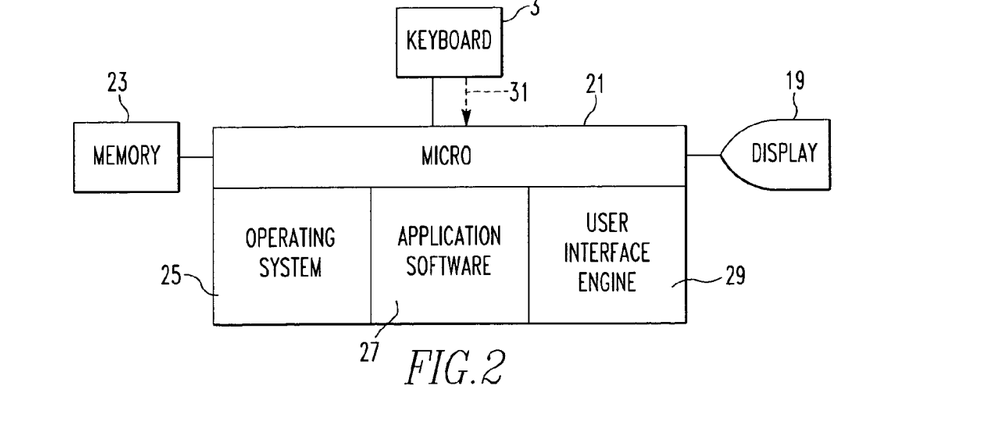
FIG. 2 is a block diagram of the major subsystems of the handheld device of FIG. 1 relevant to the implementation of embodiments of the invention.
Figure 3A:
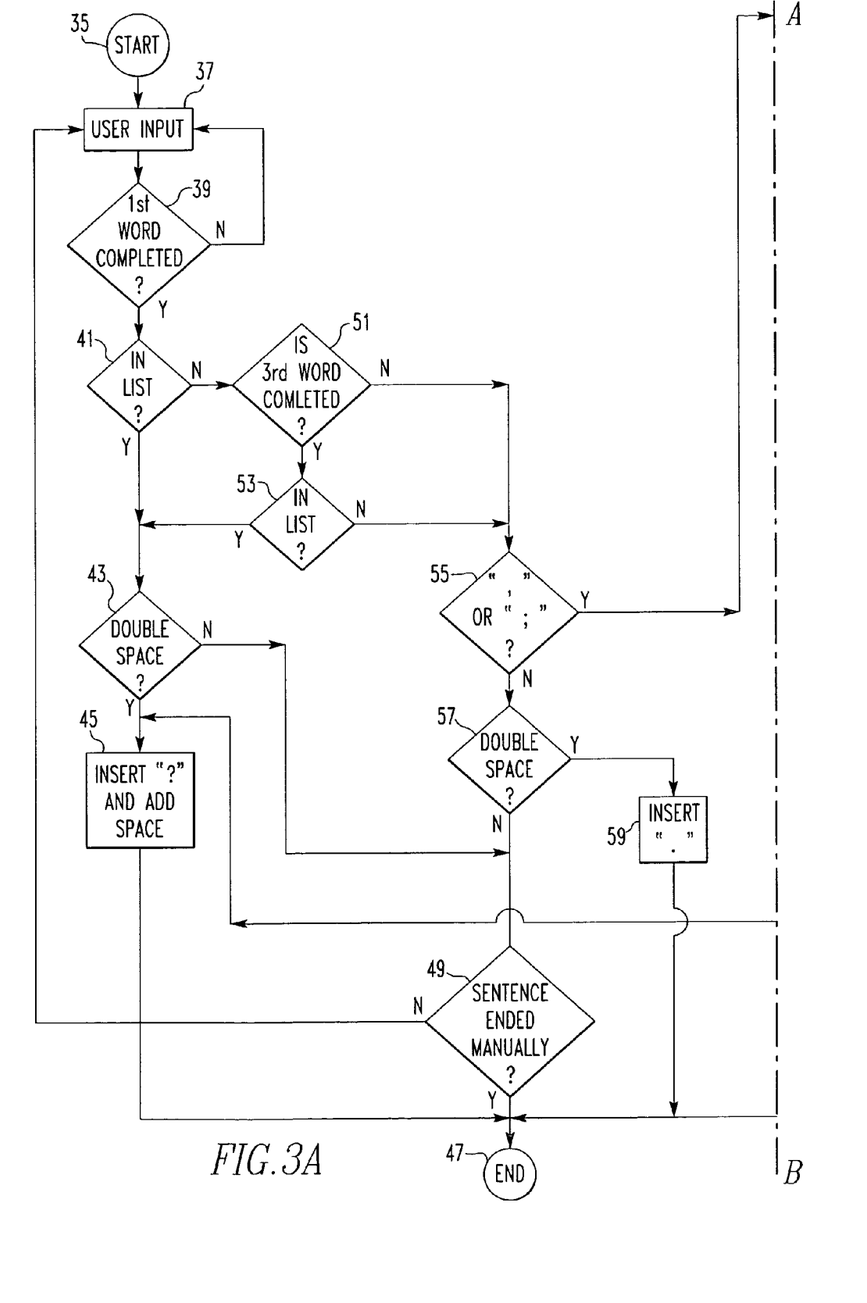
FIGS. 3A and 3B when placed side by side present a flowchart illustrating the major steps through which the exemplary embodiment of the invention is carried out.
Figure 3B:
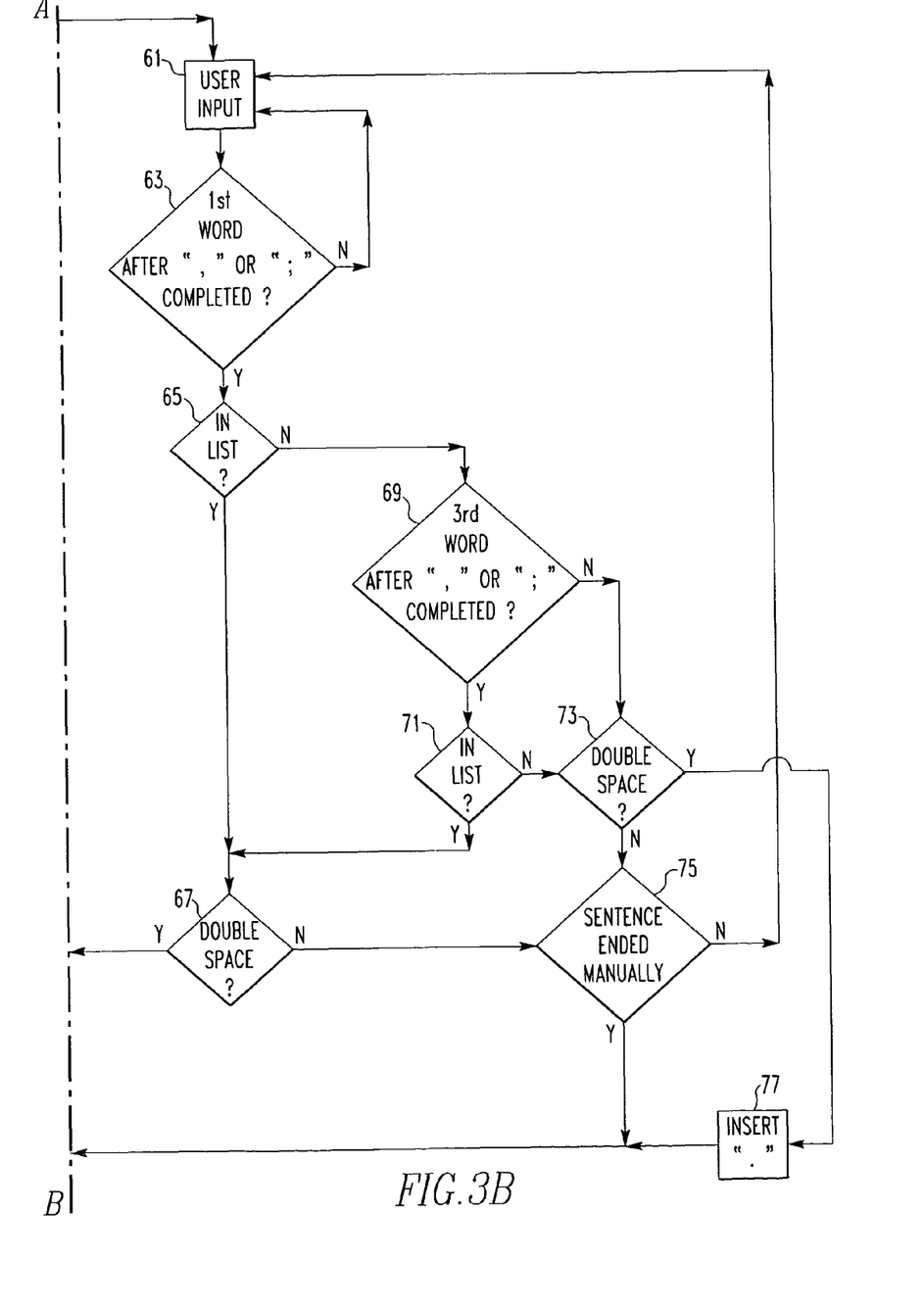

FIG. 2 illustrates in block form the major subsystems of the handheld device 1 involved in automatically adding interrogative punctuation to a sequence of characters. In accordance with this embodiment of the invention the major subsystems include the keyboard 3, a microprocessor 21, a memory 23, and the display 19. This microprocessor 21 runs various software including the operating system 25, applications software 27 and a user interface engine 29. The operating system 25 controls the overall operation of the microprocessor 21 including its interaction with the keyboard 3, memory 23 and display 19, as well as managing the operation of the remaining software, such as the application software 27 and user interface engine 29. Actuation of the keyboard 3 results in a keyboard signal 31 that is received by the microprocessor 21 and directed by the operating system 25 to the application software 27. The application software 27, in turn, performs the routine 33, illustrated in FIG. 3, that includes accessing lists of words stored in the memory 23—for example, those listed in Table 1. The user interface engine 29 controls generation on the display 19 of the message incorporating the interrogative punctuation in accordance with aspects of the invention.

Turning to FIGS. 3A and 3B, the routine 33 when called at 35 monitors at 37 the user input in the form of the keyboard signals 31. As the sequence of characters is entered, the routine 33 checks at 39 for the end of the first word, which is indicated by a single actuation of the spacebar 7. If this first word is on the list of first words stored in the memory 23, which are indicative of an interrogatory as determined at 41, the inputs are monitored for termination of the sequence of characters as indicated by detection of the double actuation of the spacebar at 43. When this is detected, the interrogative punctuation is added at 45 by inserting the "?" (question mark). In addition, a space is entered after the "?" (question mark) and then the routine is exited at 47. Until the end of the sequence is detected by the entry of the double space at 43, a check is made at 49 for manual ending of the sequence of characters such as entry by the user of the "?" (question mark) by the customary sequence of keyboard signals. As long as the sequence of characters is not terminated, either by the detection of the double spacebar actuation at 43 or the manual ending of the sentence at 49, the routine 33 loops back to pickup the next user input at 37. If the first word is not on the list of first words indicative of an interrogatory when checked at 41, the sequence of characters entered is monitored for completion of the third word at 51. If the first and third words are in the list of words indicative of an interrogatory as detected at 53—for example, those listed in Table 2, then the routine waits for termination of the sequence of characters either though entry of the double actuation of the spacebar at 43 or the manual ending of the sentence at 49 in the manner described. In one embodiment, there are separate lists of first words and successive words (such as third words and/or fourth words). In another embodiment first and successive words are both on a single list. In yet other embodiments, there are separate lists for stand alone first words (e.g., why), first words that may require a successive word (e.g., do), and third words (e.g., have).

If neither the first word nor the combination of the first word and third word are in the lists of words indicative of interrogatories, a check is made at 55 for a comma or semicolon in the sequence of characters. If no comma or semicolon has been detected, and the sequence of characters is not terminated by double actuation of the space bar at 57, the routine 33 continues to cycle as each character is entered until the sentence is ended manually at 49. On the other hand, detection of double activation of the spacebar at 57, indicates termination of a declaratory statement (no interrogatory), and hence a "." is entered at 59 and the routine is exited at 47.

When a comma or semicolon is detected at 55 in the sequence of characters entered, the routine 33 operates similarly to before detection of a comma or semicolon by monitoring the additional characters entered at 61 looking for completion of the first word after the comma or semicolon at 63 and determining at 65 whether this word is on the list of first words indicative of interrogatory. If it is, and a double actuation of spacebar is detected at 67, then the interrogative punctuation is entered at 45. However, if the first word after the internal punctuation is not in the list, as detected at 69, then upon completion of the third word after the internal punctuation, these words are checked against the list of first and third words indicative of an interrogatory at 71. If the words are on the list, and subsequently a double spacebar actuation is detected at 67, the interrogative punctuation is entered at 45. Until the third word after the internal punctuation is completed, or after it is determined that these words are not on the list of words indicative of an interrogatory at 69, the routine 33 cycles back waiting for the next user input at 61 or ends the routine upon detection of a double space at 73 or of manual termination of the sentence at 75. Again, if the first word and the first and third words after a comma or semicolon are not on the lists indicating that the statement being typed is not an interrogatory, a "." (period) is entered at 77 when the sequence is terminated by double actuation of the space bar at 73.

While specific embodiments of the invention have been described in detail, it will be appreciated by those skilled in the art that various modifications and alternatives to those details may be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of inputting interrogative punctuation into text generated by a handheld electronic device, the method comprising the steps of:

inputting at least one sequence of characters comprising the text;

examining the at least one sequence of characters for at least a first word at the beginning of the at least one sequence of characters indicative of an interrogatory; and inputting termination of the at least one sequence of characters and automatically adding the interrogative punctuation to the at least one sequence of characters when the at least first word at the beginning of the at least one sequence of characters is indicative of an interrogatory.

2. The method of claim 1, wherein the handheld electronic device has a keyboard including character keys and a full stop input and wherein inputting the at least one sequence of characters comprises actuating the character keys and wherein inputting termination of the at least one sequence of characters comprises actuating the full stop input.

3. The method of claim 2, wherein the full stop input is a spacebar and activating the full stop input comprises actuating the spacebar twice in succession.

4. The method of claim 3, wherein actuating the spacebar twice in succession adds a "?" (question mark) at the end of the at least one sequence of characters.

5. The method of claim 4, wherein actuating the spacebar twice further adds a space after the "?" (question mark).

6. The method of claim 1, wherein examining the at least one sequence of characters comprises storing a list of words indicative of an interrogatory when occurring at the beginning of the at least one sequence of characters, identifying the at least one word at the beginning of the at the least one sequence of characters, and searching the list for a match for the at least one word at the beginning of the at least one sequence of characters.

7. The method of claim 6, wherein the handheld electronic device has a keyboard with character keys and a spacebar and wherein inputting the at least one sequence of characters comprises actuating the character keys and wherein inputting termination of the at least one sequence of characters comprises actuating the spacebar twice in succession.

8. The method of claim 7, wherein storing a list of words further comprises storing in the list selected combinations of first and third words in the at least one sequence of characters indicative of an interrogatory when occurring at the beginning of the at least one sequence of characters, and identifying further comprises identifying the first and third words of the at least one sequence of characters, and searching comprises searching the list for a match for the first and third words.

9. The method of claim 1, wherein automatically adding interrogative punctuation comprising adding a "?" (question mark) at the end of the at least one sequence of characters.

10. The method of claim 9, wherein the at least one sequence of characters defines a statement in the Spanish language, and automatically adding interrogative punctuation comprises adding "¿" (inverted question mark) at the beginning of the at least one sequence of characters and adding a "?" (question mark) at the end of the at least one sequence of characters.

11. The method of claim 1 wherein examining further comprises
examining the at least one sequence of characters for at least a first word after a comma or semicolon indicative of an interrogatory, and automatically adding interrogatory punctuation further comprises adding interrogatory punctuation to the at least one sequence of characters when the at least first word after the comma or semicolon is indicative of an interrogatory.

12. A handheld electronic device comprising:
a keyboard having a plurality of keys through which at least one sequence of characters can be input and a termination input through which the at least one sequence of characters can be terminated;
a display on which the at least one sequence of characters input is displayed; and
a processor comprising means examining the at least one sequence of characters for at least one word at the beginning of the sequence of characters indicative of an interrogatory, and means for adding interrogative punctuation to the sequence of characters on the display when the termination input is actuated and the at least one word at the beginning of the at least one sequence of characters is indicative of an interrogatory.

13. The device of claim 12, wherein the means examining the at least one sequence of characters comprises a memory for storing a list of words that are indicative of an interrogatory when occurring at the beginning of the at least one sequence of characters, means identifying the at least one first word at the beginning of the at least one sequence of characters, and means searching the list for a match for the at least one word at the beginning of the at least one sequence of characters.

14. The device of claim 13, wherein the memory further stores in the list selected combinations of a first word and a third word in the at least one sequence of characters which are indicative of an interrogatory, wherein the means identifying the first word also identifies the third word in the at least one sequence of characters and wherein the means searching the list also searches for a match for the first and third words in the at least one sequence of characters.

15. The device of claim 12, wherein the means having the interrogative punctuation adds a "?" (question mark) at the end of the at least one sequence of characters.

16. The device of claim 15, wherein the at least one sequence of characters expresses words in the Spanish language and the means adding the interrogative punctuation to the at least one sequence of characters further adds a "¿" (inverted question mark) in front of the at least one sequence of characters.

17. The device of claim 12, wherein the keyboard further includes means to override the interrogative punctuation.

18. The device of claim 12, wherein the termination input comprises a spacer bar that is actuated twice to terminate the at least one sequence of characters.

19. The device of claim 18, wherein the spacer bar adds a space after the "?" (question mark) at the end of the at least one sequence of characters when actuated twice in succession.

20. The device of claim 12 wherein the means examining the at least one sequence of characters further comprises means examining the at least one sequence of characters for at least a first word after a comma or a semicolon indicative of an interrogatory, and the means for adding interrogative punctuation further comprises means adding interrogative punctuation to the sequence of characters when the termination input is actuated and the at least first word after the comma or semicolon is indicative of an interrogatory.

* * * * *

UNITED STATES PATENT AND TRADEMARK OFFICE
CERTIFICATE OF CORRECTION

PATENT NO. : 7,921,374 B2
APPLICATION NO. : 10/887279
DATED : April 5, 2011
INVENTOR(S) : Griffin It is certified that error appears in the above-identified patent and that said Letters Patent is hereby corrected as shown below:

In column 2, line 4, "space bar" should read --spacebar--.

In column 2, line 36, "means examining" should read --means for examining--.

In column 2, lines 45-46, "means identifying" should read --means for identifying--.

In column 2, line 47, "means searching" should read --means for searching--.

In column 2, lines 52-53, "means identifying the first word that also identifies" should read --means for identifying the first word also identifies--.

In column 2, lines 54-55, "means searching" should read --means for searching--.

In column 3, line 19, after "each key", insert --5--.

In column 3, line 41, after "spacebar", insert --7--.

In column 3, line 62, after "spacebar", insert --7--.

In column 3, line 65, after "spacebar", insert --7--.

In column 4, lines 10-11, "sequence of characters is indicative" should read --sequence of characters that is indicative--.

In column 4, line 29, after "spacebar", insert --7--.

In column 4, line 30, after "spacebar", insert --7--.

In column 4, line 31, "one word" should read --one-word--.

Signed and Sealed this
Twelfth Day of July, 2011

David J. Kappos
*Director of the United States Patent and Trademark Office*

CERTIFICATE OF CORRECTION (continued)
U.S. Pat. No. 7,921,374 B2

In column 4, line 36, "selected "¿"" should read --selected, "¿"--.

In column 4, line 44, "keyboard." should read --keyboard 3.--.

In column 5, line 15, "examine" should read --examining--.

In column 5, line 31, "invention the major" should read --invention, the major--.

In column 5, lines 34-35, "applications software" should read --application software--.

In column 5, line 57, after "spacebar", insert --7--.

In column 6, line 1, "pickup" should read --pick up--.

In column 6, line 8, after "spacebar", insert --7--.

In column 6, line 14, "stand alone" should read --stand-alone--.

In column 6, line 22, "space bar at" should read --spacebar 7 at--.

In column 6, line 25, "at 57, indicates" should read --at 57 indicates--.

In column 6, line 34, "indicative of interrogatory." should read --indicative of an interrogatory.--.

In column 6, line 35, "actuation of spacebar is detected" should read --actuation of the spacebar 7 is detected--.

In column 6, line 52, "space bar at" should read --spacebar 7 at--.

In claim 6, column 7, line 28, "the at the least one" should read --the at least one--.

In claim 9, column 7, line 47, "comprising" should read --comprises--.

In claim 12, column 8, line 10, "means examining" should read --means for examining--.

In claim 13, column 8, line 18, "means examining" should read --means for examining--.

In claim 13, column 8, line 22, "means identifying" should read --means for identifying--.

In claim 13, column 8, line 24, "means searching" should read --means for searching--.

In claim 14, column 8, line 30, "means identifying" should read --means for identifying--.

In claim 14, column 8, line 32, "means searching" should read --means for searching--.

CERTIFICATE OF CORRECTION (continued)
U.S. Pat. No. 7,921,374 B2

In claim 16, column 8, line 40, "means adding" should read --means for adding--.

In claim 18, column 8, line 47, "spacer bar" should read --spacebar--.

In claim 19, column 8, line 49, "spacer bar" should read --spacebar--.

In claim 20, column 8, line 53, "means examining" should read --means for examining--.

In claim 20, column 8, line 55, "means examining" should read --means for examining--.

In claim 20, column 8, line 58, "means adding" should read --means for adding--.